(No Model.)
L. F. CULVER.
STEAM COOKER.
No. 601,501.  Patented Mar. 29, 1898.
3 Sheets—Sheet 1.
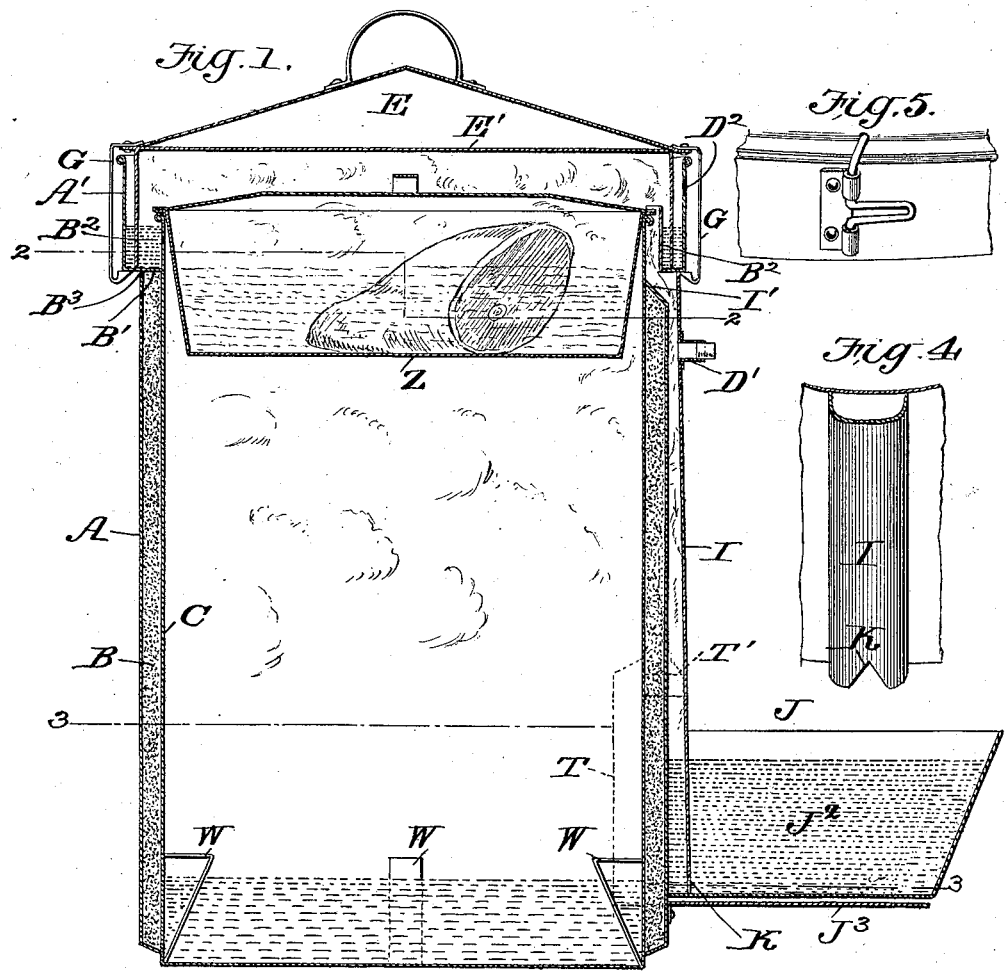
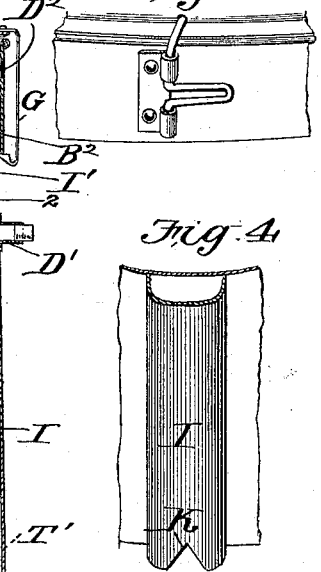
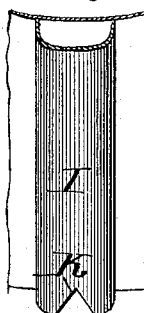
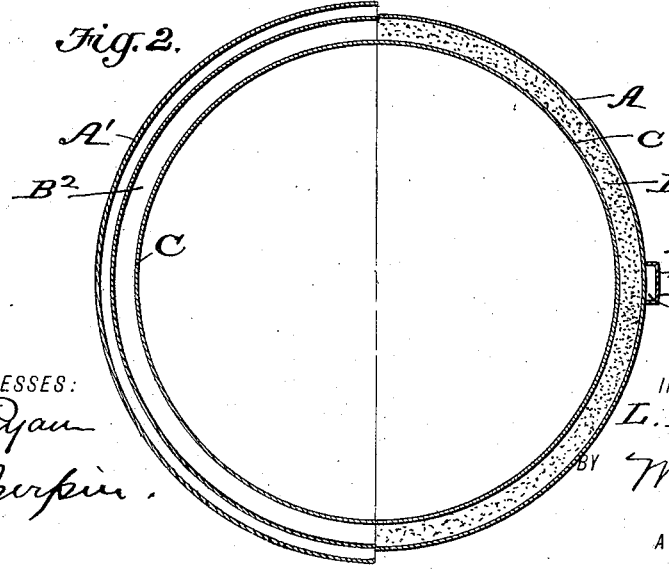
WITNESSES:
Jos. A. Ryan
P. B. Turpin
INVENTOR
L. F. Culver
BY Munn & Co.
ATTORNEYS.
THE NORRIS PETERS CO., PHOTO-LITHO., WASHINGTON, D. C.

(No Model.) 3 Sheets—Sheet 2.
L. F. CULVER.
STEAM COOKER.
No. 601,501. Patented Mar. 29, 1898.
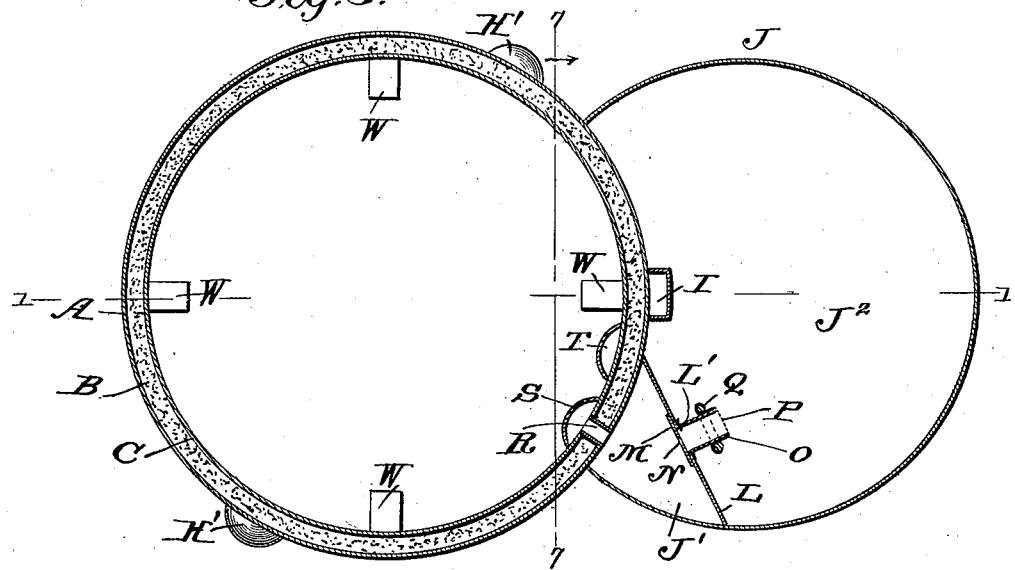
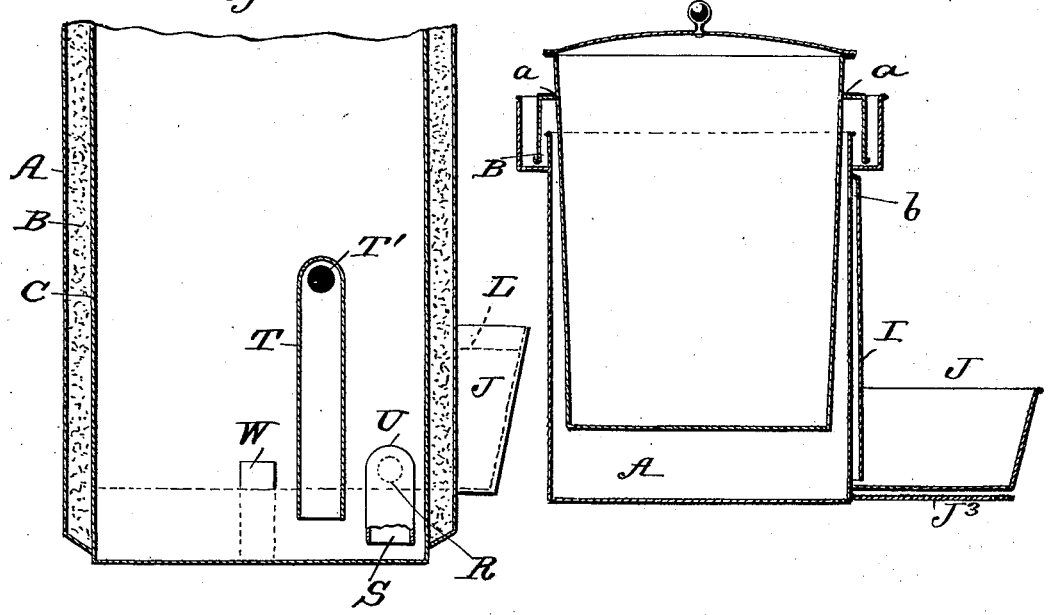
WITNESSES:
Jos. A. Ryan
P. B. Turpin
INVENTOR
L. F. Culver
BY Munn & Co.
ATTORNEYS.

(No Model.)　　　　　　L. F. CULVER.　　　3 Sheets—Sheet 3.
STEAM COOKER.
No. 601,501.　　　　　　　　Patented Mar. 29, 1898.
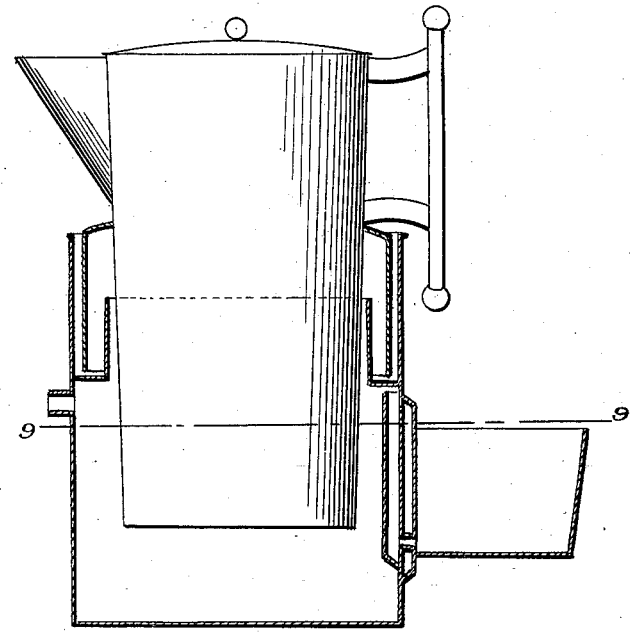
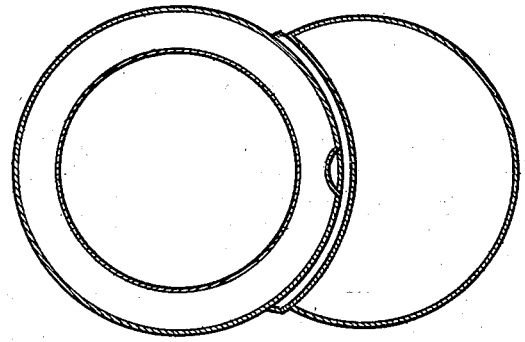
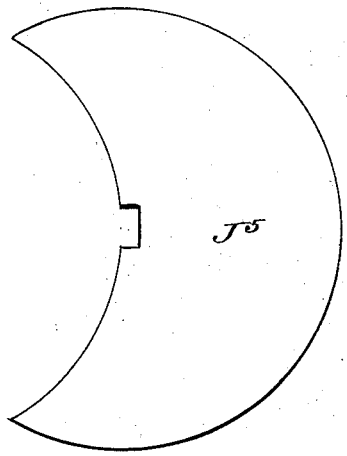
WITNESSES:　　　　　　　　　　　　INVENTOR
Jos. A. Ryan　　　　　　　　　　　L. F. Culver.
P. B. Turpin.　　　　　　　　　　BY Munn & Co.
ATTORNEYS.

UNITED STATES PATENT OFFICE.

LEWIS F. CULVER, OF HARVEY, ILLINOIS.

STEAM-COOKER.

SPECIFICATION forming part of Letters Patent No. 601,501, dated March 29, 1898.

Application filed October 15, 1896. Serial No. 608,902. (No model.)

*To all whom it may concern:*

Be it known that I, LEWIS F. CULVER, of Harvey, in the county of Cook and State of Illinois, have invented a new and useful Improvement in Steam-Cookers, of which the following is a specification.

My invention is a steam cooking apparatus which seeks, among other objects, to furnish a cooker which will require but a low degree of heat and in which the steam will be condensed in the supply, so that a small quantity of water will suffice by being used over and over.

The invention consists in certain novel constructions and combinations of parts, as will be hereinafter described, and pointed out in the claims.

In the accompanying drawings, Figure 1 is a vertical section of the cooker on about line 1 1 of Fig. 3. Fig. 2 is a horizontal section on about line 2 2 of Fig. 1. Fig. 3 is a horizontal section on about line 3 3 of Fig. 1. Fig. 4 is a detail view of the lower end of the steam-tube. Fig. 5 is a detail view. Fig. 6 shows the coffee-cooker without a handle. Fig. 7 is a detail section on about line 7 7 of Fig. 3. Fig. 8 shows the coffee-cooker with a handle. Fig. 9 is a cross-section, and Fig. 10 is a detail view.

The cooker is constructed with double walls A and C, forming insulated sides, the space B between them being preferably packed with some non-heat-conducting material or it may be left an air-space. The bottom is joined to the inner wall C. An inch or more below the top of the wall C a ring B' is soldered or seamed thereto, and a wall A' is joined to this and carried up beyond the wall C, or other equivalent construction is provided, forming a trough $B^2$ around the top of the cooker. The top of the wall A terminates at $B^3$. The cover has a lining E', forming an air-space E.

G G are springs fastened at their upper ends to the cover D and arranged to catch beneath the ring B' and hold the cover in place. The springs G G may be replaced by two catches, as shown in Fig. 5, which revolve and swing over the edge of cover.

$D^2$ is an overflow-opening in the outer wall of the annular trough.

I is a tube bent at I' to conduct the steam to the bottom of the reservoir J.

D' is a short tube, preferably soldered to the tube I. This tube D' is closed with a stopper when the cooker is in operation. The tube I is a steam flue or tube and is connected at its upper end with the body or steaming-chamber and extends at its lower end into and opens within the reservoir J below the level of the water in said reservoir.

Z is a closed compartment in which food may be placed. This compartment may be in a removable vessel, as shown, or may be built as a part of the body.

W W are brackets to support vessels that may be set down into the cooker. These vessels may be open or closed, as the case requires.

H' H' are handles.

Near one corner of the reservoir is a partition L of nearly the same height as the reservoir and dividing the latter into two compartments J' and $J^2$. The partition L has an opening L', (about one-half inch in diameter,) and over this hole is soldered a plate M of brass or copper or any metal that does not easily corrode. Through M is made a small opening N, which allows the water to pass slowly. A small tube O of brass or copper is soldered to the other side of L, and a piece of muslin or other suitable strainer P is placed over the end of O and held in place by a ring Q, slipped over O. This strainer prevents any dirt from getting into and stopping up the openings N or R, R being an opening allowing the water to pass into the interior of the cooker at the lower end of the latter.

S is a tube closed at the top and open at the bottom and reaching from a point U a little above the opening R to about three-sixteenths of an inch above the bottom of the cooker and conducts the water entering at R down to the bottom of the boiler. T is another tube also closed at the top and open at the bottom and extending from about one-half an inch of the bottom of the cooker to a point slightly above the top of the reservoir, with a tube T', which passes through both walls of the cooker and opens into the outer air.

A shield J³, of some non-heat-conducting material or anything that will keep the heat of the stove from the bottom of J, may be provided, if desired, below the bottom of said reservoir.

The operation of the cooker is as follows: Enough water is put into the cooker to cover the bottom of T, the trough B² is filled with water, and the cover put on and fastened down by the catch shown in Fig. 5, one on each side of the cooker, perfectly steam-tight. The reservoir J is filled nearly full of cold water. Over an ordinary fire steam is up in two or three minutes. Having reached the top of the body the steam enters tube I' and passing down the tube I forces its way down through the cold water in J² and escapes through one or more notches K or other suitable outlet, which causes it to escape in small bubbles, which are perfectly condensed by the water in the reservoir J², thus not only keeping the steam and odor from the room, but enabling the same water to be used over again. The water, having rushed into compartment J' from the interior of the cooker, rises in J' until its level is about one-half inch below that in J²; but the level in the latter gradually sinks, so that in about thirty minutes the water in the cooker is found to be on a level with the bottom of tube I and the water in compartments J' and J² will be at the same level. The depth of the water within the cooker is thus automatically regulated.

If in any way the water within the cooker becomes higher than the bottom of the tube I, the water in compartment J' would then stand higher than in J². In this case there would set in a flow from J' to J², which would continue till the level within the cooker was even with the bottom of the tube I. On the other hand, the lower the water stands within the cooker the greater will be the difference of level in J² and J' and the more rapid will be the flow.

T is a safety-tube. So long as the water within the cooker covers the bottom of T no steam can enter it; but if a very hot fire caused the water to evaporate faster than it would ordinarily flow into the cooker when it gets below the bottom of tube T the steam escapes through T, thus relieving the pressure and allowing the water in the compartment J' to flow in at once. This in turn accelerates the flow through N and so increases the rate of supply. This tube T is, however, not ordinarily brought into action at all in using the cooker.

The pressure required for the steam to force its way down the tube I through the water in J² is transmitted to the interior of the cooker and causes a rise in temperature. Actual experiment has determined that a thermometer within the cooker will rise 4° or 5° Fahrenheit higher than indicated by the same thermometer placed in water boiling in an open vessel. This has a tendency to hasten the cooking. Common steamers and most cookers cook slower than by boiling, because the steam becomes considerably cooled below the ordinary boiling-point; but in my cooker the temperature being higher by four or five degrees the tendency is to hasten the cooking even over boiling.

It is evident that all the steam that passes down the tube I is surplus steam, for as long as any bubbles at all come from the bottom of tube I it indicates that the maximum pressure and temperature have been attained and further heat is unnecessary. This therefore provides a means of knowing just how much heat to use, and so results in a saving of fuel.

The construction of double walls A and C with packing B affords some great advantages. After the cooker (holding three and one-half gallons) is warmed up thoroughly if the burner (gasolene) is turned down so only fifteen or twenty bubbles per minute escape from the bottom of tube I the stove will be found so low as almost to go out, and, in fact, most gasolene-stoves now in use cannot be turned low enough to produce less than fifty per minute without going out, so that when turned as low as possible they still furnish more than double the necessary heat.

In the common steamer and other cookers there is a large amount of condensation, because the air coming against the sides of the steamer cools it and the lower temperature is communicated directly to the steam through the walls of the same. In the improved cooker the double walls with the packing between prevents this condensation, so the steam is dry. For this reason food exposed to the steam not only cooks drier in the improved cooker than it can in others, but remains drier afterward and therefore excels others for keeping food in waiting. The double walls also tend to add to the durability of the cooker, because these with the packing retain much heat for a long time after removal from the stove, so that the cooker if emptied when hot can be set away without wiping, and it dries itself. This is important where servants are employed. The stopper closing D' is removed when the cover D is to be put on or taken off. This gives vent and prevents the water in B² from gushing out around the cover.

To distil water, remove the stopper from D' and put on a tube to conduct the steam to a suitable condenser. The tube I opens above the vessel Z, in order to compel the live steam to pass above Z. This insures more rapid and even cooking of food in said vessel. The reservoir being on one side of the cooker can be turned in any direction and so be out of the way.

It is evident that pouring water into reservoir J increases the pressure within the cooker and so causes water to flow from the cooker through R into J'. Replenishing the cooker with cold water therefore does not stop the boiling. If anything, it boils the harder. Tube T, while preferred, is not absolutely essential to the cooker and may be omitted. The water in the reservoir being always in view is a great means of safety and convenience.

The bubbles coming up through the water in J² can be heard in an adjoining room. The frequency and quality of the sound indicates the amount of fire and the depth of water in reservoir J and is a means of convenience and safety, as it is unnecessary to drop sewing or other work to go and see whether there is fire enough or whether more water is wanted. The water, however, lasts several hours, so more is very seldom needed for any cooking operation.

In the improved cooker the water in the reservoir is used not only as a supply for the boiler, but also as a condenser to condense the steam, all the steam generated in the boiler being forced to pass through this water before escaping.

It is my intention in practice to manufacture a coffee-cooker under the same plan as the cooker. In such case the boiler with reservoir at the side will be just the same as in the cooker, except that it may be constructed with single walls. The coffee-pot really forms the cover, the rim being soldered to the side of the coffee-pot at $a\ a$ and the opening $b$ for the escape of steam into the tube being placed slightly different, as best shown in Fig. 6.

After the apparatus has been cooking if it cools down enough to cause much condensation of the steam within the partial vacuum formed causes air to pass down the tube T and bubble up into the interior of the cooker. As the bottom of the safety-tube is at all times but little (one-half inch or less) below the surface of the water, the air enters there instead of forcing itself through the water in B², which might drive out over the top of C so much of the water in B² that when cooking began again there would be insufficient water in B² to hold the steam.

In Fig. 10 I show a cover J⁵ for the reservoir J. Such a small amount of heat is required to operate the cooker that when it is used on the cook-stove with fire enough to heat the room in cold weather much surplus steam is generated. This passing through the water in reservoir J heats it up in proportion to the quantity of steam. When warm enough, more or less steam rises from the water in the reservoir J. If the cover J⁵ be used, the steam will rise against it and condense and scarcely a particle will escape.

In Fig. 8 I show the coffee-cooker with a handle, and Fig. 9 is a cross-section on line 9 9 of Fig. 8. In this construction the walls are doubled between the body and reservoir to keep the cold water in the latter from affecting the cooking, and the steam-tube and some other parts are arranged somewhat differently from the construction shown in Fig. 1.

Having thus described my invention, what I claim as new, and desire to secure by Letters Patent, is—

1. The combination in an apparatus substantially as described, of the steaming-chamber, the reservoir alongside the lower end thereof, a port being provided connecting the said reservoir with the steaming-chamber, and a steam tube or flue communicating at its upper end with the steaming-chamber and extending at its lower end into the reservoir and opening thereinto below the top of said reservoir, whereby the steam discharged through said tube will be condensed in the reservoir and means for protecting the reservoir from the heat substantially as shown and described.

2. The combination in an apparatus substantially as described, of the steaming-chamber, the reservoir alongside the lower end of the steaming-chamber and provided with a partition dividing it into compartments communicating as described, the inner compartment being connected with the steaming-chamber, and the steam tube or flue communicating at its upper end with the steaming-chamber and extending at its lower end into and opening within the outer compartment of the reservoir substantially as shown and described.

3. The combination in an apparatus substantially as described, of the steaming-chamber or body, the reservoir alongside the same and provided with a partition dividing it into inner and outer compartments, the inner compartment communicating with the steaming-chamber or body as described and an opening being provided in the partition, and a strainer protecting said opening substantially as shown and described.

4. A steam-cooker, having a steaming-chamber, a reservoir alongside the same, an insulated wall dividing said chamber and reservoir whereby the latter will not be heated from the steam-chamber, an opening being provided between the said chamber and reservoir for passage of water, and the steam-tube leading from the top of the chamber downward into the reservoir, the flow of water from the reservoir to the chamber being retarded and limited substantially as shown and described.

5. In an apparatus substantially as described the combination of the body or steaming-chamber, the reservoir located alongside said body or chamber, means for protecting the bottom of said reservoir from heat and connections between the reservoir and the body or steaming-chamber substantially as shown and described.

6. In an apparatus substantially as described the combination of the body or steaming-chamber, the reservoir, the steam tube or chamber leading from the top of the body to the reservoir and extending down in said reservoir and opening therein below its water-line, connections between the lower end of the body and the reservoir and the safety-tube opening at its lower end within the body near the bottom thereof and opening at its upper end into the air above the top of the reservoir all substantially as shown and described.

7. An apparatus substantially as described comprising a steaming-chamber, a reservoir alongside and communicating with the steaming-chamber near its lower end, insulating devices protecting the said reservoir from the heat of the steaming-chamber and from the heating medium, and the steam tube or flue communicating at its upper end with the steaming-chamber and opening at its lower end within the reservoir substantially as described.

8. An apparatus substantially as described comprising a steaming-chamber, a reservoir alongside the same and having a partition forming it into inner and outer compartments, the inner compartment being connected with the steaming-chamber near its bottom, an opening being formed in the partition, and the steam-tube extending from the upper part of the steaming-chamber downward and discharging into the outer compartment of the reservoir substantially as shown and described.

9. An apparatus substantially as described comprising the steaming-chamber or body, the reservoir alongside the same, an opening being provided leading from the reservoir into the steaming-chamber, the steam-tube leading from the upper part of the steaming-chamber downward and discharging into the reservoir, and a cover-tube arranged in the steaming-chamber over the opening leading from the reservoir and extended downward below said opening substantially as shown and described.

10. In an apparatus substantially as described the combination of a steaming-chamber, a reservoir alongside and communicating with the steaming-chamber, a steam-tube leading from said chamber and opening into the reservoir below the top thereof and a safety-tube arranged in the steaming-chamber and arranged to release the steam-pressure when the water in said chamber has fallen below the desired level all substantially as shown and described.

11. A steam-cooker comprising the steaming-chamber having alongside its lower end a reservoir connected with said end and provided with a steam tube or flue extending at its lower end into the reservoir and opening at its upper end into the upper part of the steaming-chamber, and having at the upper end of the steaming-chamber an annular sealing-trough extending outside the upper end of the steam tube or flue, such steam tube or flue being provided below said trough with a vent and with means for controlling the same and the cover having a depending flange fitting within the annular trough in the upper end of the steaming-chamber, substantially as described.

12. A steam-cooker comprising the steaming-chamber having at its upper end an annular trough and at its lower end a lateral reservoir in communication with the lower end of the steaming-chamber and provided with a steam tube or flue extending from said reservoir upward and opening at its upper end into the steaming-chamber, and the cover having a flange fitting in the annular trough substantially as described.

LEWIS F. CULVER.

Witnesses:
 EVA L. BLISS,
 ANNA L. CULVER.